H. H. Lindhorst,
Carpet Cleaner.

No. 111,355. Patented Jan. 31, 1871.

Witnesses:
J. W. Herthel,
Robert Burns.

Inventor:
Hermann Henry Lindhorst

United States Patent Office.

HERMANN HENRY LINDHORST, OF ST. LOUIS, MISSOURI.

Letters Patent No. 111,355, dated January 31, 1871.

IMPROVEMENT IN CARPET-CLEANERS.

*The Schedule referred to in these Letters Patent and making part of the same.*

*To all whom it may concern:*

Be it known that I, HERMANN HENRY LINDHORST, of St. Louis, in the county of St. Louis and State of Missouri, have made certain new and useful Improvements in Carpet-Cleaners; and I do hereby declare that the following is a full and true description thereof, reference being had to the accompanying drawing and to the letters of reference marked thereon.

This invention relates chiefly to the method of supporting and operating the beaters, as an improvement to that described in the Letters Patent of the United States issued to me for improved carpet-cleaning machine, bearing date the 14th day of June, 1870, and being numbered 104,171.

In the use of the beaters, constructed, arranged, and operated as described in my said Letters Patent, in all cases when the carpet or other cloth material to be cleaned had holes or was ripped in any manner, the point or head of the beater sticks or lashes would become caught, and by their operating action seriously tear, rip, and otherwise damage said cloth or carpeting; the beater sticks, becoming thus entangled or caught in said stuff, necessitating stoppage of the machine, and frequently said beaters would be broken, destroyed, and rendered ineffective for use, all incurring extra labor, loss of time, and imperfect operation.

To avoid said inconveniences, and in general to form an improved carpet-cleaning machine, the improvements here presented relate to such a manner of supporting and operating said beaters, that the same in their beating action shall regulate themselves, as now to be more fully described.

To enable those skilled in the art to make and use my said invention, I will now more fully describe the same, referring herein to the accompanying—

Figure 1:
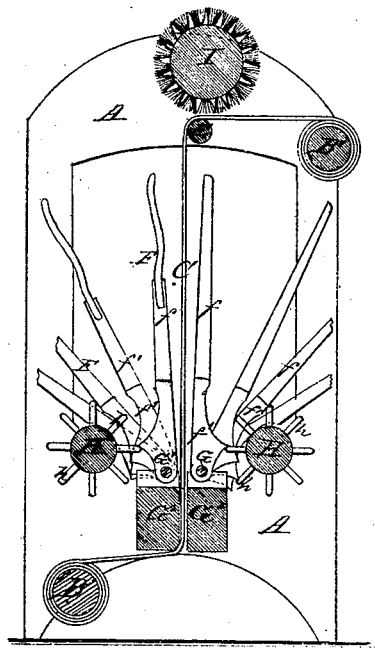

Figure 1 as a vertical sectional elevation; to

Figure 2:
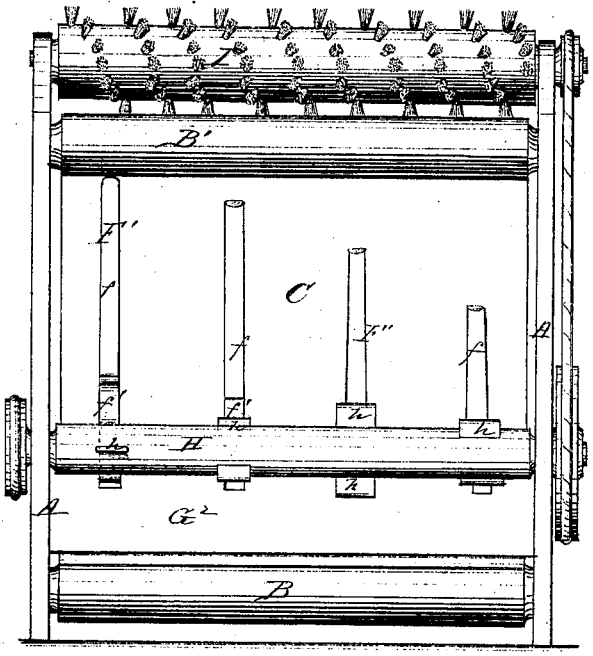

Figure 2 as a front elevation; and to

Figure 3:
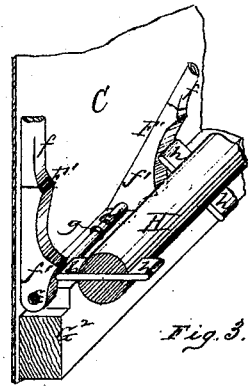

Figure 3 as a detail perspective, showing manner of securing and operating the beaters.

The operating parts are secured upon a frame, A.

Connecting said frame top and bottom are the respective drums B and B'. On the lower drum the carpet C is unwound for cleansing, the cleaned carpet winding on the top drum B'.

The carpet is arranged to pass vertically between said drums B and B', being guided over a roller, E, and subjected to the blows or lashings of the beaters F and F', as described in my said Letters Patent, and as clearly shown in the figures.

The beater-sticks $f$ are secured in tappet-heads $f'$, and supported so as to turn freely upon the respective shafts $G G^1$, secured by staples $g$, in any proper manner to the transverse beams $G^2$, as clearly shown in figs. 1 and 3.

The beaters are set in motion by the cam-shafts H, having pronged cams $h$, so arranged as to produce alternation of action. At the ends of the cam-shafts they will connect by suitable gearing, and they will be driven by the power source in any ordinary manner.

On the top of the machine the carpet is subjected to the action of the brush I, its shaft being operated by suitable belting or gearing and otherwise said machine to propel the carpet is provided with proper gearing devices, as described in my said Letters Patent, and which are readily arrangeable.

As the beaters F and F' have their tappet-heads $f'$ arranged to turn freely in transverse shafts $G G^1$, the vibrating action of the carpet is sufficient to place said beaters in position to be operated upon by the cams $h$ of the shaft H.

By thus simply arranging said beaters, any one of which becoming caught and held fast in the cloth in any manner, it is evident that said beater thus held, is placed out of the reach or action of the cam-shaft H, and therefore remains inoperative; also, that as soon as the material or stuff has been carried sufficiently in its vertical movement, said caught beater or beaters become released and forced to resume again the required operation of beating.

Having thus fully described my said invention,

What I claim is—

The shafts $G G^1$, secured by staples $g$ to the transverse beams $G^2$, in combination with the beaters F F', beater-sticks $f$, tappet-heads $f'$, and cam-shaft H, when arranged to operate substantially as and for the purpose described.

In testimony of said invention I have hereunto set my hand in presence of—

H. HENRY LINDHORST.

Witnesses:
 WILLIAM H. HERTHEL,
 ROBERT BURNS,